United States Patent [19]

Saatweber et al.

[11] Patent Number: 5,981,696
[45] Date of Patent: Nov. 9, 1999

[54] PROCESS FOR PREPARING COATING POWDER COMPOSITIONS AND THEIR USE FOR MAKING COATINGS

[75] Inventors: Dietrich Saatweber; Karin Maag; Wolfgang Diener; Peter Klostermann, all of Wuppertal; Thomas Berger, Essen, all of Germany

[73] Assignee: Herberts GmbH, Germany

[21] Appl. No.: 08/765,716

[22] PCT Filed: Jun. 10, 1995

[86] PCT No.: PCT/EP95/02241

§ 371 Date: Feb. 10, 1997

§ 102(e) Date: Feb. 10, 1997

[87] PCT Pub. No.: WO95/34606

PCT Pub. Date: Dec. 21, 1995

[30] Foreign Application Priority Data

Jun. 14, 1994 [DE] Germany ............... 44 20 640

[51] Int. Cl.$^6$ ................ C09D 5/03; C08F 6/06
[52] U.S. Cl. ............ 528/501; 528/483; 528/490; 528/498; 528/502 E; 523/331; 523/342; 264/5; 264/12; 427/372.2; 427/385.5; 427/421
[58] Field of Search ............... 528/483, 498, 528/501, 502 E, 490; 523/331, 342; 264/5, 12; 427/421, 372.2, 385.5

[56] References Cited

U.S. PATENT DOCUMENTS

| | | |
|---|---|---|
| 2,347,464 | 4/1944 | Guna et al. . |
| 4,012,461 | 3/1977 | Van Brederode ............... 264/12 |
| 4,582,731 | 4/1986 | Smith . |
| 4,734,451 | 3/1988 | Smith ............... 524/545 X |
| 5,211,342 | 5/1993 | Hoy et al. . |
| 5,290,827 | 3/1994 | Shine . |

FOREIGN PATENT DOCUMENTS

| | | |
|---|---|---|
| 2 233 138 | 1/1974 | Germany . |
| 40 28 567 | 3/1992 | Germany . |
| WO 92/00342 | 1/1992 | WIPO . |
| WO 94/09913 | 5/1994 | WIPO . |

OTHER PUBLICATIONS

*Ullmans Enzyklopedia der Technischen Chemie,* v. 15, p. 680, 4th ed. 1978, Verlag chemie, Weinheim (English translation attached).

H. Kittel, *Lehrbuch der Lacke und Beschichtungen,* v. 14, Verlag W.A. Colomb in der H. Heenemann GmbH, Berlin (English translation attached), 1976.

Derwent abstracts, JP 53005239, Jan. 1994.

Matson et al, "Rapid Expansion of Supercritical Fluid Solutions: Formation of Powders, Thin Films, and Fibers", Ind. Eng. Chem. Res., 1987, 26(11), pp. 2298–2306.

Mawson et al, "Formation of . . . Submircon Fibers and Particles from Supercritical Carbon Dioxide Solutions", Macromolecules, 1995, 28 (9), pp. 3182–3191.

*Primary Examiner*—Fred Teskin
*Attorney, Agent, or Firm*—Merchant and Gould P.C.

[57] ABSTRACT

The invention concerns a process for preparing coating powder compositions in which one or a plurality of base resins and one or a plurality of hardeners, each of which is in solid form, is dissolved with a low-molecular compound above its critical pressure and critical temperature. This low-molecular compound is inert with respect to the base resins and hardeners and is in gaseous form under normal operating conditions with respect to pressure and temperature. The pressure of the resultant solution is then reduced, for example, by spraying. The resultant coating powder composition can be sprayed directly onto a substrate to be coated. Coating powders can also be recycled according to the process of the invention.

13 Claims, No Drawings

PROCESS FOR PREPARING COATING POWDER COMPOSITIONS AND THEIR USE FOR MAKING COATINGS

This invention relates to a process for producing coating media in powder form, which can also be carried out directly during the production of coatings from such coating media within the scope of a spray coating process. According to one embodiment, the invention also relates to a process for the recycling of powder coating materials.

There is a multiplicity of methods of producing duroplastic powder coatings which have hitherto become known. The process which is currently by far the most widely employed in practice is the production of powder coatings by the extrusion, in the form of a paste-like melt, of the powder coating which is ready-formulated by mixing all the requisite components, followed by cooling the melt, coarse comminution, fine grinding and a downstream sieving stage to produce the desired fineness of grain (see Ullmans Enzyklopädie der technischen Chemie, Volume 15, page 680, 4th Edition, 1978, Verlag Chemie Weinheim; and H. Kittel, Lehrbuch der Lacke und Beschichtungen, Volume 4, page 355, Verlag W. A. Colomb, Berlin). Coating powders produced in this manner possess a series of disadvantages.

If highly reactive binder vehicle mixtures are processed, the extrusion operation often proceeds too slowly, so that partial gel formation is observed. These powders can then no longer be used for coatings.

A very broad particle size spectrum is normally formed on comminution, namely in the range from less than 0.1 $\mu$m to what is usually up to 500 $\mu$m. A subsequent sieving stage to produce particle size fractions suitable for the specific purpose of application may become necessary.

The oversize grain then has to be comminuted again in a downstream comminution stage. The fine grain fraction, which comprises particle sizes smaller than 5 $\mu$m, is particularly problematical as regards workplace hygiene, due to its capacity of entering the lungs and due also to the increased risk of dust explosions. Furthermore, fine-grained powders have process technology disadvantages.

In addition, processes have become known which are suitable for producing powder coatings and for coating with powder coatings such as these, which employ the spraying of powder coating melts.

Thus DE-A-22 33 138 describes the production of duroplastic and thermoplastic powder coatings by the spraying of molten binder vehicles or binder vehicle mixtures. The base resin and hardener are melted and mixed together in a heated mixing vessel. When duroplastic powder coatings are produced, only those hardeners are employed which do not yet exhibit their crosslinking effect in the temperature range which is typical for the process. This process is particularly unsuitable for highly reactive powder coatings.

A process for producing powder coatings is known from WO-92 00 342 in which a molten mixture of a film-forming binder vehicle and a hardener for this binder vehicle is atomised, i.e. sprayed. The droplets formed in the course of this procedure are cooled to below their softening point in a short time, so that no significant crosslinking occurs within the particles. Solid lacquer particles of spherical form and narrow particle size distribution are formed. After cooling, the particles are separated from the carrier gas stream by suitable measures. Their chemical composition does not differ from that of customary powder coatings produced by the extrusion and comminution of a resin/hardener melt, and they can be applied using typical methods of application for powder coatings.

The processes described in DE-A-22 33 138 and WO-92 00 342 have the common disadvantage that the base resin and hardener components of the duroplastic powder coating are melted before spraying and have to be mixed as melts. Relatively high temperatures have to be used for melting, which results in thermal loading of the powder coating composition. This is problematical, particularly in the case of highly reactive powder coatings, since in order to prevent gelling or partially gelling a considerable effort has to be made to minimise the time of contact of the base resin and hardener in the molten state.

In a coating process using powder coatings there is an unavoidable occurrence of powder coating overspray, which should preferably be fed to a recycling process.

Customary processes for the reuse of powder coating overspray operate in a manner such that the powder coating overspray is mixed with fresh powder coating and this mixture is subsequently used for coating. This is particularly problematical when producing coatings on which the highest demands are made as regards visual quality, such as in the coating of motor vehicles for example.

DE-A-40 28 567 describes a recycling process for powder coating overspray or for the residue from powder classification, in which the material to be recycled is fed back to the powder coating production process before extrusion or in the course of the extrusion process. A disadvantage here is that the recycled material is subjected to renewed thermal loading on re-extrusion; this can result in unwanted crosslinking and partial gel formation, particularly for highly reactive powder coating materials.

Moreover, it is known from Japanese Patent 53-5239 laid open to public inspection that powder coating overspray can be used dissolved in organic solvents as a solvent-containing lacquer system, or as an aqueous slurry after suspending it in water, i.e. it is not reused as a powder coating.

The object of the present invention is to provide a process which enables duroplastic powder coatings which contain at least one base resin and at least one hardener component, as well as thermoplastic powder coatings, to be produced in a simple manner with the avoidance of thermal loading which is too severe. In addition, the object is substantially to avoid grinding and sieving steps. Duroplastic powder coatings are preferably produced.

Another object of the invention is to provide a simplified process for the recycling of powder coating materials, which in particular avoids the thermal loading of the powder coating material to be recycled. A further object is that the process should enable physical contaminants which may possibly be present in the powder coating to be recycled to be removed from the latter.

In addition, the process according to the invention should enable aqueous suspensions of powder coatings to be produced in a simple manner.

It has been shown that this object can be achieved by the process, to which the invention firstly relates, for producing powder coating compositions containing base resin and hardener components or containing thermoplastic resins, or for producing aqueous suspensions of powder coatings such as these. The process is characterised in that one or more base resins and one or more hardeners or one or more thermoplastic resins, which are each present in solid form, are jointly dissolved in at least one low molecular weight compound, which exists in gaseous form under normal conditions of pressure and temperature and which is inert to the base resins and hardeners or thermoplastic resins, at a pressure and at a temperature which are suitable for converting the low molecular weight compound at least into the liquid state, and the solution obtained is subsequently depressurised.

The applied pressure and the temperature employed are also hereinafter described as the process pressure and process temperature, respectively. These can be selected so that the critical pressure and the critical temperature of the inert compound are exceeded.

A process is known from U.S. Pat. No. 5,211,342 in which polymeric compounds which are suitable for forming a coating on a substrate are dissolved in a hypercritical fluid and the solution is applied to a substrate in a spraying process with the formation of a liquid coating. The polymeric compounds used are customary lacquer binder vehicles which are liquid at normal temperature; they are not binder vehicles and hardeners or powder coatings which are solid at room temperature. The aforementioned patent does not mention the production of powder coatings or their application, nor does it mention the recycling of powder coatings.

A process for producing very fine powders by depressurising a solution of a solid in a supercritical fluid is known from U.S. Pat. No. 4,582,731. The powders can be used as catalysts. The production of extremely finely divided powders which is described in this patent is seen as an alternative to plasma processing. Inasmuch as the coating of surfaces is mentioned, a "molecular spray" of individual molecules or atoms is deposited as a film on a substrate. No stimulus as regards the production or application of powder coatings is given in this patent.

The process according to the invention may be carried out, for example, in a manner such that the base resin and hardener components of the powder coating compositions or thermoplastic resins are mixed together in solid form, a low molecular weight compound, which exists in gaseous form under normal conditions of pressure and temperature and which is inert to the base resins and hardeners or thermoplastic resins, is added thereto in a suitable amount, and conditions of pressure and temperature are set which are above or below the critical pressure and the critical temperature of the inert compound, so that a solution is produced of the powder coating composition in the low molecular weight compound, and this solution, which is under pressure, is subsequently depressurised.

For example, the base resin and hardener components forming the powder coating composition may be mixed in solid form, optionally with the addition of additives, in a pressure vessel, e.g. in an autoclave. The base resin and hardener components may previously have been mixed as a melt. However, they are preferably used separately in solid form in the process according to the invention, for example as a powder or as a granular material. In this respect, smaller particles, e.g. of about 1 mm diameter, exhibit better dissolution behaviour than do larger particles. A low molecular weight compound, which exists in gaseous form under normal conditions of pressure and temperature and which is inert to the base resin and hardener components, is subsequently added in a suitable amount, and conditions of pressure and temperature are set which are above or below the critical pressure and the critical temperature of the low molecular weight, gaseous compound, so that a solution is produced, which is under pressure, of the powder coating composition in the low molecular weight compound. In general, the formation of this solution after setting the corresponding conditions of pressure and temperature requires a period of time in the range from 1 minute to 3 hours, preferably less than 1 hour.

For example, a temperature range from −20 to +100° C. is preferably employed, most preferably from +20 to +70° C., whilst pressures within the range between 0.15 and 50 MPa are preferably applied. The above conditions of temperature prevent the reaction of base resin and hardener components, or gel formation.

The base resin or base resins and the hardener or hardeners or the thermoplastic resin or thermoplastic resins can be used at least in part in the form of powder coating material which is to be recycled.

Apart from powder coating overspray, the expression "powder coating material to be recycled" is also to be understood as meaning the oversize and undersize grain which arises in powder classification. The powder coating materials which can be recycled by the process according to the invention may be thermoplastic powder coating materials, but duroplastic powder coating materials are preferred in the process according to the invention.

For example, the powder coating materials to be recycled may be placed in a pressure vessel, e.g. in an autoclave. In this respect, smaller particles, e.g. of about 1 mm diameter, exhibit better dissolution behaviour than do larger particles. A low molecular weight compound, which is gaseous under normal conditions and which is inert to the powder coating material, is subsequently added in a suitable amount, and conditions of pressure and temperature are set which are above or below the critical pressure and the critical temperature of the low molecular weight, gaseous compound, so that a solution is produced, which is under pressure, of the powder coating composition in the low molecular weight compound. In general, the formation of this solution after setting the corresponding conditions of pressure and temperature requires a period of time in the range from 1 minute to 3 hours, preferably less than 1 hour. For example, a temperature range from −20 to +100° C. is preferably employed, most preferably from +20 to +70° C., whilst pressures within the range between 0.15 and 50 MPa are preferably applied. The above conditions of temperature do not have a damaging effect on the components of the powder coating material. For example, in the case of the duroplastic powder coatings which are preferably recycled by the process according to the invention, the reaction of the base resin and hardener components forming the basis of the powder coating is prevented.

The powder coating material to be recycled may therefore be processed as such, or in admixture with fresh starting material, for the production of the powder coating by the process according to the invention.

Low molecular weight compounds which are gaseous under normal conditions, particularly those which are liquid at temperatures of 10 to 150° C. and at pressures of 0.15 to 60 MPa, and/or particularly those which are supercritical fluids at temperatures of 20 to 150° C. and pressures of 3 to 60 MPa, can be used as solvents for forming the solutions of powder coating compositions.

The preferred examples of low molecular weight compounds, which are gaseous under normal conditions, which are inert to base resin and hardener components, and which are suitable for forming solutions under pressure with the powder coating compositions, are carbon dioxide, dinitrogen monoxide, chlorotrifluoromethane, monofluoromethane, ethane, propane and butane. For example, carbon dioxide (critical temperature: 31.3° C., critical pressure: 7.4 MPa, critical density: 0.45 g cm$^{-3}$) may be employed as the low molecular weight compound which is liquefied under pressure or as the supercritical fluid in the process according to the invention. In this respect, conditions of pressure and temperature are most preferably set under which carbon dioxide has a density of 0.6 to 1.0 g cm$^{-3}$. For example, carbon dioxide can be employed as a liquefied gas within a temperature range between 10 and 30° C. and at pressures between 4.5 and 7 MPa, or as a supercritical fluid within a temperature range between 40 and 70° C. and at pressures between 10 and 30 MPa.

In the process according to the invention, the concentration of the powder coating composition in the solution which is under pressure may, for example, be 1 to 80% by weight with respect to the binder vehicle solids comprising the base resin and hardener components. It is preferably between 5 and 70% by weight.

The pressure vessel which contains the solution of the powder coating composition can preferably be heated to a controlled temperature and is preferably fitted with a stirring or agitating device or with another device serving for homogenisation, for example a source of ultrasound or a rotor-stator device, in order to assist the formation of the solution. After the solution has formed, it is depressurised down to pressures below the process pressure, for example down to normal pressure.

Depressurisation of the solution to below the process pressure, e.g. down to normal pressure, may be effected in various ways. For example, the solution may be depressurised spontaneously, i.e. within a very short time interval, or it may be depressurised inside the pressure vessel in a time-dependent manner, for example over a period of time between a few seconds and several hours. The temperature is preferably controlled in the course of this procedure, and it may be advantageous for depressurisation to be effected under substantially isothermal conditions. If necessary, the solution can be freed from physical contaminants, which do not dissolve in the inert compound, by filtration before depressurisation.

Filtration may be carried out batch-wise or preferably continuously. Extraction inserts in autoclaves, which are known to one skilled in the art, are suitable for batch-wise operation. Filtration may be effected here through sieves, cloth, filter fibres, or preferably through sintered plates made of inert material, preferably made of metal, e.g. stainless steel. Filtration in continuous operation is preferably effected using the in-line cartridge filters which are known to one skilled in the art and which are used in practice.

Spontaneous depressurisation of the solution of the powder coating composition can be effected, for example, by spraying it into an environment which is at a pressure below the process pressure, and which is preferably at atmospheric pressure. In the course of this procedure, the powder particles which are formed should be cooled to below their glass transition temperature. This can be accomplished, for example, by utilising the enthalpy of evaporation of the liquefied or supercritical solvent. It is also possible to select the ambient temperature to be below the glass transition temperature of the powder coating composition. The solvent which is gaseous under normal conditions, e.g. carbon dioxide, escapes spontaneously, and powder coating particles are formed.

The environment which is at a pressure below the process pressure may be water which optionally contains a wetting agent into which spraying is effected, wherein the water is at a temperature below the glass transition temperature of the powder coating composition. Aqueous suspensions of powder coatings are obtained. It must be ensured that depressurisation by spraying under water is only carried out with those powder coating compositions which are chemically inert to water and resistant to hydrolysis.

The environment which is at a pressure below the process preferably is a gaseous environment, for example air or an inert gas.

Spraying is effected by means of a spraying device attached to the pressure vessel, e.g. a nozzle or a rotating cone. Spraying is preferably effected vertically, i.e. perpendicularly from top to bottom. The powder coating particles which are formed are cooled below their glass transition temperature during the depressurisation process. This can be assisted by external cooling, e.g. by spraying into a cold vessel, for example a spray tower with cooled walls, or a cooled stream of inert gas or air may be used to cool the particles further. Inert gas or air of this type is preferably conditioned in a manner which is typical for powder coatings, i.e. so that it is oil-free and dry. The wall temperature of the spray chamber is preferably less than a value of 25° C., and is most preferably less than 20° C., in order to prevent aggregation of powder particles on the wall.

The particles are separated at the end of the spray tower in a manner known to one skilled in the art, e.g. by means of a cyclone. It is also possible to effect a separation into classified grain size fractions suitable for the application concerned by means of a downstream sieving operation, e.g. through metal cloth.

The particle size of the powder coating particles can be influenced by suitably selecting the process parameters (e.g. throughput, nozzle diameter, viscosity or concentration of the solution under pressure) The particles generally have a diameter of 5 to 150 $\mu$m. Particle sizes of 10 to 100 $\mu$m are preferred for use in the coating of automobiles, for example. The particle size is most preferably less than 60 $\mu$m. If the particle size is greater than 100 $\mu$m, air inclusions are often observed in the lacquer film and the flow of the stoved lacquer is impaired. It is then difficult to produce high-gloss, defect-free coatings in accordance with the requirements of the automobile industry.

Particles smaller than 5 $\mu$m are avoided if at all possible, for reasons of workplace hygiene. Monomodal grain size distributions are preferably produced, i.e. those which can be described in terms of a Gaussian distribution curve.

The process according to the invention may also be carried out directly before the application of the powder coatings obtained, i.e. in practice in the form of a powder coating process. In the course of this process, the spraying described above of the solution under pressure is effected directly on to a substrate to be coated. In this manner, the production of the powder coating is immediately followed by a coating operation. A coating booth is employed here, the operating temperature of which is below the glass transition temperature of the powder coating particles. The coating booth can be maintained at a controlled constant temperature, for example. In this procedure, the spraying units may be disposed so that they are movable, and the course of their movement during spraying may be oriented according to the geometry of the substrate to be coated. For example, they may be disposed on a device for automatic movement. The spraying may be electrostatically assisted.

Following the atomisation process, the powder coating particles which are formed are rapidly cooled, after depressurisation, below their glass transition temperature (measured by DSC) before the lacquer particles impinge on the surface of the substrate to be coated. This period of time is generally in the range from 0.1 to 1 second. The distance between the spraying device and the substrate to be coated must be calculated so as to ensure certainty of cooling below the glass transition temperature before the particles impinge on the substrate. In general, this distance is between 20 and 100 cm, for example, and is preferably between 30 and 70 cm. The glass transition temperatures of the powder coatings preferably fall within the range between 30 and 80° C.

A further embodiment of the process for producing duroplastic powder coatings or thermoplastic powder coatings according to the invention consists of effecting depressurisation of the solution of the powder coating composition which is under pressure in a time-dependent manner rather than spontaneously. Depressurisation may be effected continuously or in steps. When using continuous depressurisation, the depressurisation rates may remain constant or may be varied. During depressurisation, the solubility of the powder coating composition in the system decreases, i.e. powder coating material of homogeneous composition precipitates from the solution under pressure. It is advisable to conduct the depressurisation operation under controlled conditions of temperature, for example isothermally, i.e. the cooling which takes place during the depressurisation operation is counteracted by corresponding heating measures in opposition. The operating temperature here is preferably below the glass transition temperature of the powder coating composition.

After reaching normal pressure, a homogeneous solid, which has a foam-like structure or which consists of individual particles which have a particle size between 5 and 150 μm, can be removed from the pressure vessel. Monomodal grain size distributions are preferably produced, i.e. those which can be described by a Gaussian distribution curve. Examples of parameters by means of which an effect can be exerted on the particle size or the distribution thereof in the process according to the invention include: the concentration of the powder coating composition in the solution under pressure, the temperature and the course of the temperature during depressurisation, the pressure, and the rate of depressurisation. The effect of these parameters can easily be determined by one skilled in the art with the aid of simple tests, and they can be deliberately set in the process according to the invention so that a particle size spectrum which is suitable for the purpose of the application is produced. During the depressurisation operation, the mixture is advantageously thoroughly mixed.

It may be advantageous to subject powder coating materials formed by a time-dependent depressurisation within the scope of the present invention to a subsequent comminution step with a low expenditure of energy. Units known to one skilled in the art can be used for this purpose, such as product bed roller mills for example, or the milling units which are customary in powder coating technology may be used with short product dwell times which are atypical for powder coating, i.e. with a high mass throughput per unit time. By this means, the solid, which has a foam-like structure or which consists of individual particles which may possibly adhere together, can be separated into individual particles. The powder coatings which are produced by spontaneous or time-dependent depressurisation by the process according to the invention can be subjected to a sieving operation. However, in general this is not necessary.

Comminution may also be effected in the presence of water which optionally contains wetting agents. The powder coating material can be mechanically separated from the aqueous suspension obtained in this manner and dried, or the aqueous suspension of powder coating may be used directly for coating purposes.

Using the process according to the invention, all duroplastic powder coating compositions, and all thermoplastic powder coating compositions also, can be processed which, after the addition of a sufficient amount of a low molecular weight compound, which exists in gaseous form under normal conditions of pressure and temperature and which is inert to the base resins and hardeners of the powder coating composition, or after the addition of a mixture of compounds such as this, and after setting a pressure and a temperature which are suitable for converting the low molecular weight compound or the mixture of such compounds into the liquid state, form a solution under pressure in the low molecular weight compound.

The expression "base resin" is to be understood as meaning the film-forming higher molecular weight component of a duroplastic powder coating, which generally makes up at least 50% by weight of the underlying base resin/hardener combination, whilst the hardener component generally makes up a maximum of 50% by weight of this combination. In principle, the binder vehicle basis of the base resins is subject to no restrictions. For example, base resins which are customary for powder coatings are suitable. Examples include: polyester resins, (meth)acrylic copolymers, epoxy resins, phenolic resins, polyurethane resins and siloxane resins. The base resins have glass transition temperatures of 30 to 120° C., for example, preferably less than 80° C., and have number average molecular weights (Mn) of 500–20,000, for example, preferably less than 10,000. The hardeners have number average molecular weights (Mn) of 84–3000, for example, preferably less than 2000. Different base resins and hardeners can be mixed with each other.

The base resins and hardeners contain complementary functional groups between them, which enable a crosslinking reaction to be effected under the stoving conditions of the powder coating. Examples of functional groups include carboxyl groups, epoxide groups, aliphatically or aromatically bonded OH groups, silanol groups, isocyanate groups, blocked isocyanate groups, anhydride groups, primary or secondary amino groups, blocked amino groups, N-heterocyclic groups capable of ring-opening addition, such as oxazoline groups for example, (meth)acryloyl groups, and acidic CH groups such as acetoacetate groups for example.

The selection of groups which react with each other is familiar to one skilled in the art. Different reactive groups may optionally be combined with each other. This can be effected by way of binder vehicles which contain different reactive functional groups, or mixtures of different hardeners and/or base resins can be used.

Different functional groups may be present at the same time in the base resin and/or hardener. The base resins, and also the hardeners, contain on average at least 2 functional groups per molecule. The ratio of base resin to hardener is generally 98:2 to 50:50, for example. It is preferably between 95:5 and 70:30. A plurality of base resins and a plurality of hardeners may also be present in admixture.

The powder coatings produced by the process according to the invention are preferably powdered clear lacquers. If necessary, customary powder coating additives may be admixed. Examples of additives such as these include levelling agents, degassing agents such as benzoin for example, antioxidants, light stabilisers, matting agents, colour- or effect-imparting inorganic and/or organic pigments and/or extenders, colorants, bonding agents, slip additives, catalysts and rheological agents. For reasons of their ease of handling, these are preferably added in the form of a master batch. Additives are preferably added which are soluble in the inert compound.

Liquid additives may be added to the binder vehicles before the addition of the inert compound. In another procedure, the additives are added as a separate master batch before the addition of the inert compound.

The powder coatings which are produced by the process according to the invention by spontaneous or time-dependent depressurisation and which are optionally applied directly to the object to be coated are characterised by particle sizes larger than 5 μm and by monomodal particle size distributions.

The powder coatings which are produced and processed by the process according to the invention can be influenced by way of additives. If anti-corrosive pigments are used, it is possible to employ the powder coatings as anti-corrosive coating media. If they are used as a primer surfacer or as a stone impact protection coat, for example, the content of pigments/extenders can be increased to up to 30% by weight with respect to the final powder coating, for example. The coat thickness of primer surface or stone impact protection coats produced from powder coatings such as these is between 40 and 300 μm in the stoved state, for example.

If covering pigments are used, and optionally effect pigments also, the coating media produced can be used as base lacquers or covering lacquers. In particular, when covering pigments are used which are soluble in the liquefied compound or in the supercritical solvent, the process according to the invention offers the advantage that after the depressurisation of the solution which is under pressure these pigments are present in the final powder coating in homogeneous and very finely divided form. If no pigments are used, or if colourless pigments are used, e.g. micronised titania or silica, the coating media produced are the preferred clear powder coating media which can be produced and processed by the process according to the invention.

When used as covering lacquer or clear lacquer coating media, these can be applied, for example, to the substrates which are customary in the automobile industry, e.g. to substrates which are provided with primer surfacer or base lacquer coatings. The latter may optionally have been stoved previously, or coating may be effected by the dry-into-wet method. Customary, conventional lacquer systems can be used for these coats, but the use of environmentally-friendly solids-rich or aqueous systems is preferred. In their stoved state, covering lacquer or clear lacquer coats produced from the powder coatings produced by the process according to the invention generally have coat thicknesses between 30 and 150 μm, for example, preferably between 40 and 80 μm.

Fusion, flow and chemical crosslinking of the coatings are effected after the coating operation, by heating, for example to 80 to 240° C., preferably 100 to 220° C.

The overspray formed when working with powder coatings produced by the process according to the invention can be separated from the air in the booth by the usual methods and can be recycled as a high-quality powder coating material. It can be applied to the substrate, as can the powder coating produced according to the invention also, by customary powder coating application techniques, e.g. by spray application and also by sintering processes. Examples of processes such as these include tribo-spraying, optionally ESTA-assisted spraying, optionally ESTA-assisted whirl sintering, fluidised-bed techniques and belt coating processes.

Alternatively, the powder coating overspray can also be dissolved in suitable organic solvents, filtered if necessary and subsequently used as a solvent-based system. This is outstandingly suitable for the coating for repair purposes of corresponding powder coating coats, since the solids composition of the powder coating and of the solvent-based lacquer are identical, i.e. the self-colour and index of refraction of the primary and the repair coatings do not differ from each other, for example.

The process according to the invention enables powder coatings or aqueous suspensions of such powder coatings to be produced in a simple manner. Extrusion and melting of the base resin and hardener components are avoided, i.e. there is only a very slight temperature loading when bringing together the base resin and hardener components.

The process according to the invention enables the oversize and undersize grain, as well as the overspray, from powder coatings of the same type of composition to be recycled in a simple manner. In particular, the process enables a powder coating to be recovered, without a change in its chemical composition, which has a particle size distribution suitable for coating purposes. The powder coatings which are recycled by the process according to the invention, by spontaneous depressurisation or preferably by time-dependent depressurisation, and which are optionally applied directly to the object to be coated, are characterised by particle sizes larger than 5 μm and by monomodal particle size distributions.

The process according to the invention avoids any undesirable thermal loading of the powder coating material to be recycled and enables physical contaminants to be removed in a gentle manner by filtration.

The powder coatings obtained by the recycling process according to the invention exhibit good application technology properties and can be reused for coating purposes. The result of the coating operation here corresponds to that obtained with fresh powder coating of the same composition.

The process according to the invention enables the unwanted formation of fine grain fractions to be avoided. Grinding and sieving steps are not necessary.

EXAMPLE 300 g of a dicarboxylic acid polyanhydride (Additol VXL 1381, a commercial product supplied by Hoechst) and 700 g of a solid glycidyl methacrylate copolymer with an epoxide equivalent weight of 370 and a number average molecular weight of 2100 were separately weighed into a 10 liter high-pressure autoclave. After closing the autoclave, carbon dioxide was introduced through a high-pressure capillary and a pressure of 33.5 MPa was set in the autoclave by means of a compressor. At the same time, the temperature of the mixture was set at 34° C. via a thermostat device. After 40 minutes' operation, the resulting solution was depressurised to atmospheric pressure. After opening the lid of the autoclave a uniform solid with a foam-like structure could be removed. This material was subsequently comminuted using a low expenditure of force. The average particle size was 30 μm.

We claim:

1. A process for producing a powder coating composition comprising dissolving in a low molecular weight compound at a pressure and temperature which maintain the low molecular weight compound in a liquid state, one or more solid base resins and one or more solid hardeners to form a solution, and depressurizing the solution to form the powder coating composition, wherein the low molecular weight compound exists in gaseous form under normal conditions of pressure and temperature and is inert to the base resins and hardeners.

2. A process according to claim 1, wherein the one or more base resins and the one or more hardeners are used at least in part in the form of powder coating material which is to be recycled.

3. A process according to claim 1, wherein a fluid which is supercritical at temperatures of 20–150° C. and pressures of 3–60 MPa is used as the low molecular weight compound which is gaseous under normal conditions.

4. A process according to claim 1, wherein carbon dioxide, dinitrogen monoxide, chlorotrifluoromethane, monofluoromethane, ethane, propane or butane is used as the low molecular weight compound.

5. A process according to claim 1, wherein base resins and hardeners are placed in a vessel together with one or more additives for powder coatings and are dissolved in the low molecular weight inert compound.

6. A process according to claim 1 wherein the solution is depressurised inside a pressure vessel.

7. A process according to claim 1 wherein the solution is spontaneously depressurised by spraying into an environment which is at a pressure below the process pressure.

8. A process according to claim 7, wherein spraying is effected in the form of a spray application on to a substrate to be coated with the powder coating composition.

9. A process according to claim 8, wherein spraying is effected with one or more mobile spray units, the course of movement of which is matched to the geometry of the substrate to be coated.

10. A process for production of a cured coating on a substrate comprising spraying the solution onto the substrate according to the process of claim 8 and subsequently curing the powder coating on the substrate to form the cured coating.

11. A process according to claim 10 wherein the cured coating is a clear lacquer coat.

12. A process according to claim 10 wherein the substrate is a motor vehicle.

13. A process according to claim 11 wherein the substrate is a motor vehicle.

* * * * *